A. F. MONEUSE.
COFFEE AND TEA URN.
APPLICATION FILED JUNE 21, 1910.

1,015,058.

Patented Jan. 16, 1912.

Witnesses
J. Milton Lester
Frank G. Brunton

Inventor
Alphonse F. Moneuse
By Thos. A. Johnson
Attorney

UNITED STATES PATENT OFFICE.

ALPHONSE F. MONEUSE, OF NEW ROCHELLE, NEW YORK.

COFFEE AND TEA URN.

1,015,058.   Specification of Letters Patent.   Patented Jan. 16, 1912.

Application filed June 21, 1910. Serial No. 568,196.

*To all whom it may concern:*

Be it known that I, ALPHONSE F. MONEUSE, a citizen of the United States, residing at New Rochelle, in the county of Westchester and State of New York, have invented certain new and useful Improvements in Coffee and Tea Urns, of which the following is a specification.

This invention relates to coffee or tea urns.

The principal object of the invention is to provide an apparatus of this character, in which either coffee or tea may be prepared ready for use, within a comparatively short time and in predetermined quantities, the hot water service-pipe being so graduated by means of faucets, that boiling water may be withdrawn from successive levels, in measured quantities, and supplied to the coffee or tea receptacle.

A further object of the invention is to provide a construction wherein the beverage may be circulated from its receptacle and made to pass as many times as desired, over the coffee or tea, to increase the strength of the beverage, thus doing away with the necessity of running the beverage off in a pitcher or other receptacle and pouring the same from the pitcher over the coffee or tea, as is usual in apparatus of this character.

Other advantages of the invention will become apparent upon a complete disclosure thereof.

Figure 1:
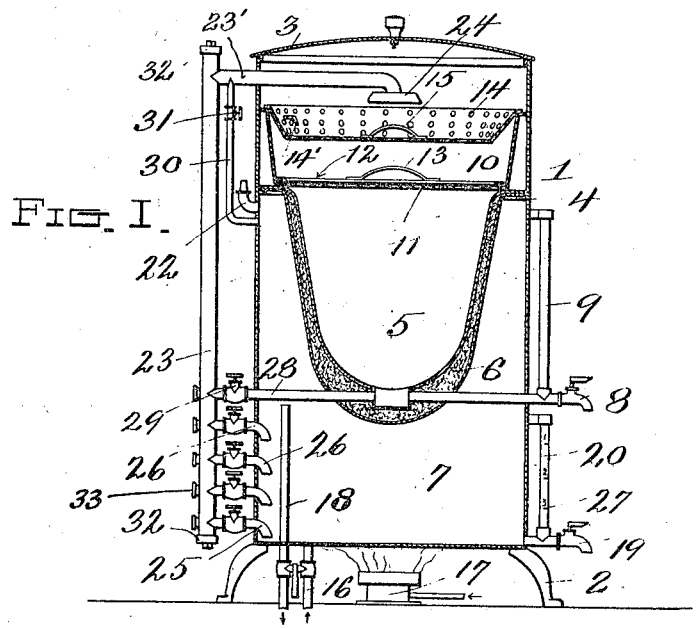
Figure 2:
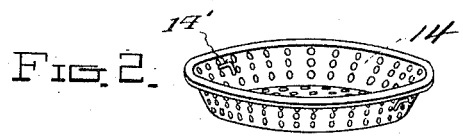
Figure 3:
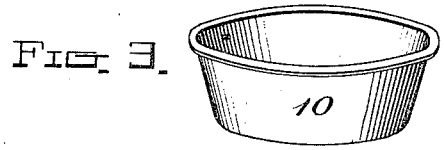
Figure 4:
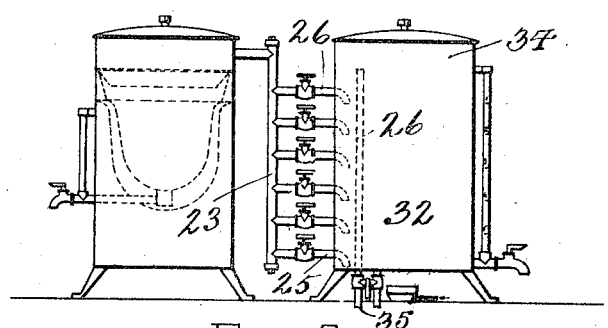

In the drawings:—Figure 1 is a central, vertical section of my improved urn; Fig. 2 is a perspective view of the strainer cover to the percolator; Fig. 3 is a similar view of the dish-shape strainer or percolator; and Fig. 4 is a modification of the apparatus, showing a separate boiler in which the water is heated and supplied therefrom to the urn in regulated or prescribed quantities.

Referring to the several views, the numeral 1 indicates a suitable metallic vessel supported upon legs 2, and provided with a cover 3. A suitable distance from the top of the vessel, the inner wall is provided with an annular ledge 4, which supports a double-walled vessel 5, for containing the beverage desired to be made. The walls of this vessel are preferably made of metal, with an interposed filling of heat-insulating material 6, preferably wool, and said walls are soldered together at their point of juncture. The portion of the vessel surrounding and below the container-vessel forms a hot-water chamber or boiler 7, and is made water-tight by cementing around the ledge upon which said container-vessel is supported. The container is provided with a suitable draw-off faucet 8, the pipe of which is in communication with a suitable glass gage 9 for indicating the level of the beverage in the container.

Mounted upon the container is a dish-shape percolator or strainer 10, in which the coffee or tea is placed. The bottom of the percolator is suitably perforated, and fitted down upon said bottom is a strainer-cloth 11 held firmly in place by a ring 12, which is provided with a bail 13 by means of which the ring may be removed to renew the strainer-cloth. Fitting on the percolator is strainer 14, which has its bottom and side wall provided with closely-spaced perforations, so that any foreign matter, which may be in the water used, will be prevented from getting into the coffee or tea. This strainer forms a cover for the percolator, and is fastened thereto by means of a bayonet joint 14', the connecting stud of which is shown on the inner wall of the percolator, and the slot in the wall of the strainer-cover is shown in Fig. 2, said cover being provided with a bail or handle 15 by which it may be removed when disconnected. Water is supplied to boiler 7 by means of the valved-inlet 16, and heating means 17, or a coil, as may be preferred, may be provided to heat the water. The chamber is provided with an valved overflow pipe 18, to gage the quantity of water supplied, and with a draw-off 19, which is in communication with a glass gage 20 for indicating the level of the water contained in the boiler, the valves of the inlet and overflow pipes being operated by a common handle, as shown in Fig. 1. The boiler is also provided with a safety-valve 22 for regulating the pressure within the same.

An important feature of my invention is the means by which the boiling water is conveyed to the coffee or tea. This means consists of a feed pipe 23, situated preferably outside of the vessel, provided at its upper end with a branch pipe 23' which projects through the wall into the vessel, said branch pipe being provided with a removable sprinkler 24, situated just above the strainer-cover of the percolator. Near the lower end of the pipe 23 is provided a faucet 25, which opens into the boiler, near the bottom thereof. Arranged above the faucet 25, at prescribed intervals, is a number of similar faucets 26, all in communication with the pipe 23 and the boiler. The object and purpose of these faucets is to permit a measured quantity of boiling water to be forced through the pipe 23 and out through the sprinkler 24, by the pressure of the steam generated in the boiler. The gage 20 is provided with graduated-marks 27, and the relative arrangement of these marks to the mouths of the faucets is such that by opening the upper faucet 26, a given quantity of boiling water will be forced through the pipe 23 and supplied to the percolator. After this supply is exhausted and the upper faucet 26 closed, the intermediate faucet 26 is opened and another given quantity supplied to said percolator, and so on with all of the faucets until the boiler is practically emptied, and again replenished. It will be obvious that any desired number of faucets may be arranged on the pipe 23, and corresponding number of indicating-marks provided on the gage 20.

Communicating with the bottom of the receptacle 5 is a pipe 28 provided on the outside of the boiler with a valve 29. This pipe communicates with the pipe 23. Let into the side of the boiler and into the branch pipe 23' is a steam injector pipe 30, provided with a valve 31. When it is desired to circulate the beverage from the receptacle 5, through pipes 28 and 23, strainer pipe, and strainer 24, to pass it several times over the coffee or tea to increase the strength of the beverage, the valve 31, is opened, permitting steam, under pressure, to pass through the branch pipe and thereby draw the beverage from the receptacle 5 through pipes 28 and 23, delivering it again into the strainer. After the strength of the beverage has been increased to the desired degree, the valves 29, and 31 are closed. The beverage will continue to circulate as long as these valves remain open.

In order to readily clean the pipe 23, I provide the end thereof with a removable cap 32, and also suitable openings closed by caps 33, for cleaning out the faucets.

From the above description, the operation of making the beverage desired, will be readily understood and further explanation rendered unnecessary, other than to state that the boiling water falls from the sprinkler into the strainer-cover and thence into the percolator upon the coffee or tea contained therein, through which it percolates or drips into the container.

In the modification shown in Fig. 4, a boiler 34 is situated externally of the vessel or urn, said boiler being provided with the necessary means for supplying and heating the water and with an overflow-pipe 35, and with an inlet-pipe similar to those shown in Fig. 1. Boiling water is supplied to the percolator through the medium of faucets 25 and 26 and pipe 23, as heretofore described.

Having thus fully described my invention, what I claim, is:—

1. An infusion apparatus, having in combination a beverage-container, a percolator arranged above the container, a boiler and a number of supply-devices arranged at different vertical levels, whereby measured quantities of water may be withdrawn from the boiler and fed into the percolator.

2. An infusion apparatus, having in combination a beverage-container, a percolator arranged above the container, a boiler, a feed-pipe, and a plurality of valved devices in communication with the boiler and feed-pipe, whereby measured quantities of water may be withdrawn from the boiler and supplied to the percolator.

3. An infusion apparatus, having in combination a beverage-container, a percolator arranged above the container, a boiler, a feed-pipe, and a plurality of faucets vertically arranged on the feed-pipe at prescribed distances apart and in communication with the boiler, whereby measured quantities of water may be withdrawn from the boiler and fed into the percolator.

4. An infusion apparatus, having in combination a beverage-container, a percolator arranged above the container, a boiler, a feed-pipe in communication with the lower part of the boiler and the upper part of the apparatus, said feed-pipe being provided with faucets in communication with the boiler and arranged vertically thereon at prescribed distances apart, whereby measured quantities of water may be withdrawn from the boiler and fed into the percolator, and a valved-pipe in communication with the beverage-container and the feed-pipe, and a valved injector-pipe in communication with the boiler and feed-pipe, whereby continued circulation of the infusion through the percolator and container may be obtained to give additional strength thereto.

In testimony whereof I affix my signature in presence of two witnesses.

ALPHONSE F. MONEUSE.

Witnesses:
Daniel F. Snover,
Joshua T. Rose.